United States Patent [19]

Bauer

[11] 4,421,395

[45] Dec. 20, 1983

[54] MOVIE CAMERA SPROCKET DRIVE MECHANISM

[76] Inventor: Fritz Bauer, Loquaiplatz 13/26, A-1060 Vienna, Austria

[21] Appl. No.: 295,890

[22] Filed: Aug. 24, 1981

Related U.S. Application Data

[63] Continuation of Ser. No. 61,623, Jul. 30, 1979, abandoned.

[51] Int. Cl.³ .............................................. G03B 1/56
[52] U.S. Cl. .................................... 352/159; 352/166
[58] Field of Search ................................. 352/159, 166

[56] References Cited

U.S. PATENT DOCUMENTS

| | | | |
|---|---|---|---|
| 1,097,483 | 5/1914 | Triplett | 352/159 |
| 1,247,786 | 11/1917 | Blair | 352/159 |
| 1,271,623 | 7/1918 | Segel | 352/159 |
| 1,319,847 | 10/1919 | Cameron | 352/159 |
| 2,474,972 | 7/1949 | Coutant et al. | 352/159 |

Primary Examiner—Monroe H. Hayes

Attorney, Agent, or Firm—Blum, Kaplan, Friedman, Silberman & Beran

[57] ABSTRACT

A sprocket drive mechanism for transporting film through a motion picture camera includes a frame and a sprocket wheel rotatably supported on the frame and adapted to engage the film. A drive plate is rotatably supported on the frame which is rotated by a drive mechanism. A knob is coupled to the sprocket wheel for rotation therewith. A coupling plate is rotatably supported on the frame and is axially coupled to the knob for selectively rotating the knob. The knob, where manually actuated, axially displaces the coupling plate between a first position where the coupling plate is engaged with the drive plate for rotation therewith and a second position where the coupling plate is disengaged from the drive plate. The coupling plate, when in the first position, rotates the knob which in turn rotates the sprocket wheel. The knob, when the coupling plate is in the second position, is manually rotatable to permit manual rotation of the sprocket wheel to adjust the film.

6 Claims, 4 Drawing Figures

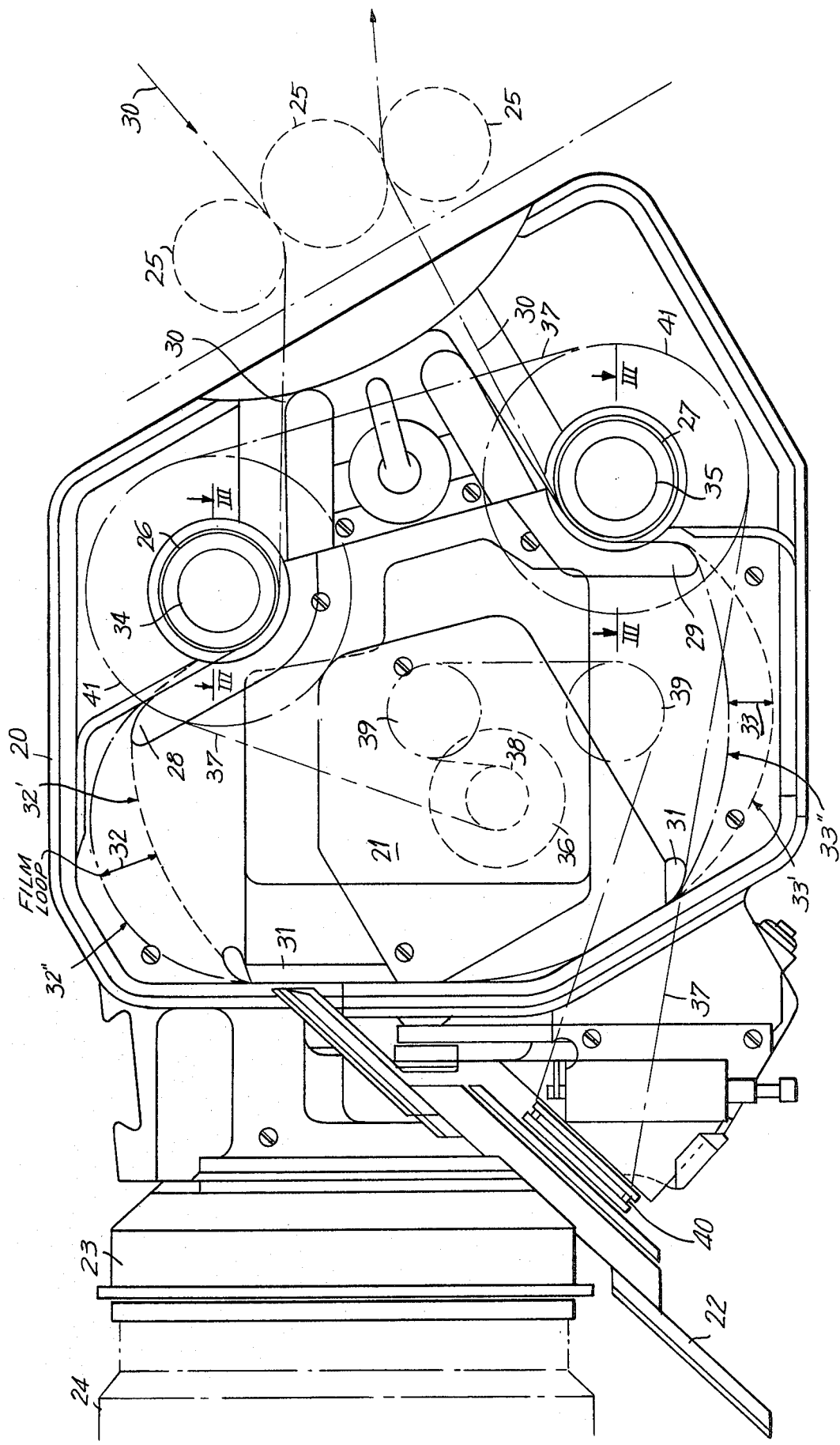

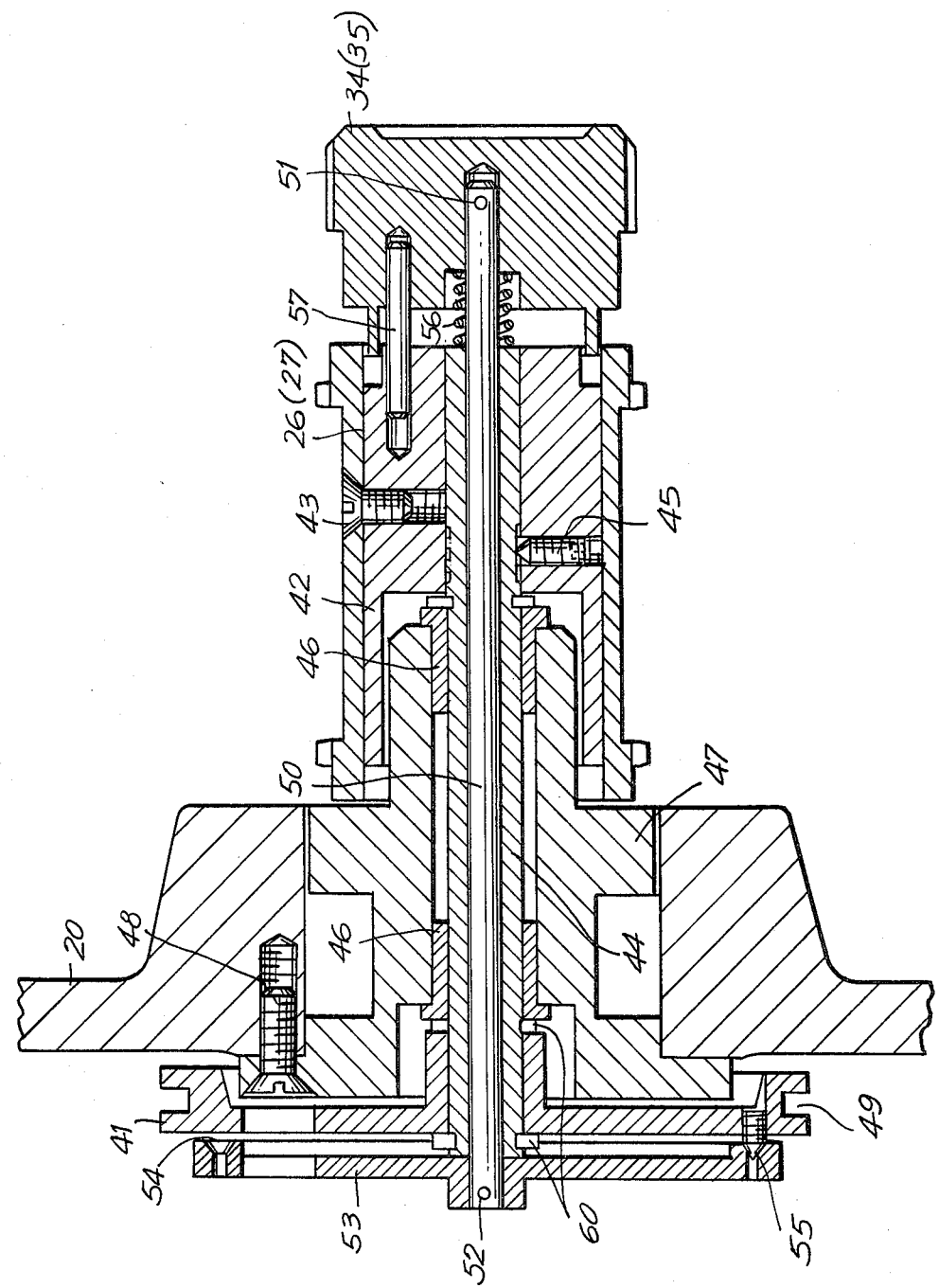

MOVIE CAMERA SPROCKET DRIVE MECHANISM

CROSS-REFERENCE TO RELATED APPLICATION

This is a continuation of application Ser. No. 61,623, filed July 30, 1979, now abandoned.

BACKGROUND OF THE INVENTION

The invention is directed to a motion picture camera with a film transport mechanism synchronously drivable by a central drive system, a rotating mirror shutter and a device for pulling out the unexposed film from a film-unwinding spool and returning the exposed film to a film-winding spool.

In known motion picture cameras of this type, the device for pulling out and returning the film consists of a single sprocket which is continuously driven and rigidly coupled to the drive system; the unexposed film entering the camera and the exposed film leaving the camera are both transported by this sprocket. The film transport for the picture-taking is driven intermittently, for example by means of a maltese cross drive, so as to transport the film frame-by-frame past the image window. In sound-synchronous photography, i.e., with sound movies, this transport proceeds at 24 or 25 frames per second.

In order to accommodate this intermittent film transport performed by the film transport mechanism to the continuous film transport performed by the sprocket, the film must be formed into loops ahead of and behind the film transport mechanism. When a frame is being exposed and the film at the image window is stationary, the loop ahead of the film transport mechanism grows larger and that behind the film transport mechanism grows smaller.

This necessitates a painstaking loading process of the film material into the camera, since the loops can only be of a certain limited size as a result of space limitations inside the camera. Moreover, it must be ensured, i.e., by hand manipulation or otherwise, that the frame of film lies precisely at the image window. This makes loading of the film into the camera complicated, and usually the loading must be repeated several times until the above-described conditions are simultaneously and exactly fulfilled. Upon each such repetition, the pressure rollers which hold the film against the sprocket must be released, and the transporting, track-engaging and holding pins of the film transport mechanism must be disengaged. Only then can the position of the film over the image window (also known as the frame mask), or the length of the loops, be changed.

SUMMARY OF THE INVENTION

Accordingly, the instant invention is to appreciably simplify this loading process, particularly with regard to the adjusting of the loops.

The aforenoted problems are solved according to the invention by providing a mechanism for pulling out and returning film to the magazine using separate sprockets each of which can be independently decoupled from the drive system, and freely rotated and after the film is loaded the sprockets are recoupled to the drive system.

This produces the result that, in loading the film into the camera, one need only pay attention to the precise registration of the film frame with the image window. Since each of the two loops is provided with its own sprocket, each loop can be adjusted separately. Because each sprocket can be decoupled from the drive system and rotated independently of the other, the film does not need to be lifted off of the sprocket to adjust the loop but can be left on the sprocket, which not only substantially simplifies loading of the camera but makes such loading more precise.

BRIEF DESCRIPTION OF THE DRAWINGS

FIG. 2 is an enlarged front view of a motion picture camera constructed in accordance with the instant invention;

FIG. 3 is a sectional view of the sprocket rollers of the invention taken along line III—III of FIG. 2.

DETAILED DESCRIPTION OF THE PREFERRED EMBODIMENTS

Figure 1:
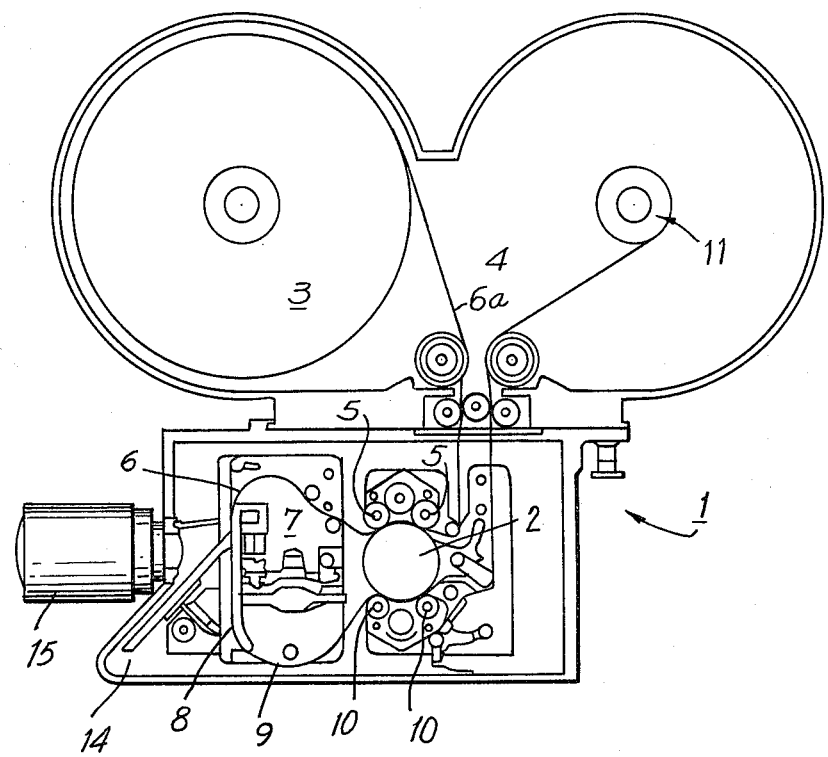
FIG. 1 is a schematic front view of the inside of a motion picture camera and film magazine according to the state of the art.

FIG. 1 shows schematically a motion picture camera 1 according to the state of the art, having a single sprocket 2 which is rigidly coupled to and continuously driven by the drive system. The unexposed film 6a passes froms the film unwinding spool 3 of the film magazine 4 to the sprocket 2 and is pressed against the sprocket by pressure rollers 5; in this way the pulling out of the film from the film magazine is ensured. The film then travels to the film transport mechanism, with the film between the sprocket and the film transport mechanism forming a loop 6. The film platform with an image window is designated 8, the film is intermittently transported by this image window in overlapping relationship with respect thereto. The mirror shutter 14 is continuously driven by the drive system in a conventional manner. The photographic optics are mounted to the camera housing in the usual manner. Following the passage of the film through the film transport mechanism 7 it returns, again in the form of a loop 9, to sprocket 2, and is pressed against this sprocket by pressure rollers 10. In this way the back-transport or return of the film to the magazine and winding is completed. With this known type of motion picture camera the only way to adjust the length of the upper loop 6 and that of the lower loop 9, which loops are necessary for the optimal accommodation of the intermittent film transport mechanism—to the continuous film transport carried out by the sprocket 2, is to lift up the pressure rollers 5 or 10, respectively, remove the film from the sprocket, and then replace the film against the sprocket, which is a complicated and a time-consuming maneuver. Usually a single performance of the maneuver is not sufficient to accomplish the desired adjustment of the loops.

FIG. 2 depicts a motion picture camera with the housing, film magazine, and photographic optics all removed. A film transport mechanism 21 and a mirror shutter 22 are supported on a mounting frame 20. A mounting 23 is provided for the photographic optics. Photographic optics 24 and film guide rolles 25 of the film magazine are depicted in dotted lines.

The mechanisms for delivering and returning the film in accordance with the invention are spiked sprocket rollers 26 and 27 which rollers are separated from each other and have film passing thereagainst. The unexposed film 30 entering the camera passes over spiked roller 26 and the exposed film 33 leaving the camera and returning to the magazine passes over spiked roller 27. Film guides 28 and 29 hold the film in position as it passes over the spiked rollers, holding it in pressure contact with the rollers. These guides can be displaced away from the spiked rollers when the film is being loaded. In the loading process, the film 30 is first pulled away from the unwinding spool or reel of the film magazine and positioned over spiked roller 26. The film is then positioned on the film platform 31 of the film transport mechanism 21 so that the transport and stop engaging and holding pins of the "pull-down claw" of the film transport mechanism engage the perforations in the film in such a way that when the film will be in the stationary phase of transport, the frames will be exactly covered by and in proper registry with the image window. By this arrangement no attention need be paid at any time to the configuration of length of the film loop between the sprocket, spiked sprocket roller 26 and the film transport mechanism 21.

The film is next passed from film platform 31 to the spiked sprocket roller 27 and in engagement therewith. The film is then passed through rollers 25 and attached to film winding spool or reel of the film magazine. The film magazine is not shown in FIG. 2, since it is not essential to the invention. What is an essential feature of the invention is the fact that no attention need be paid to the configuration of length of loop 33 when the film is being inserted over spiked roller 27.

The setting up of the configuration, which is required for and which will provide a trouble-free film transport through the camera can therefore be performed independently for the upper and lower loops. As will be demonstrated in more detail in connection with FIG. 3, each spiked sprockets 26 and 27 can be decoupled from the drive system by pressing control knobs 34 and 35, respectively, whereupon said rollers are freely rotatable, so that both loops 32 and 33 can be independently enlarged or diminished by rotating knobs 34 and 35 in either clockwise or counterclockwise directions. The loops should be set in such a way that the two extreme positions that a loop assumes immediately before (loops 32' and 33', respectively) and immediately after (loops 32" and 33", respectively) the exposure by the film gate are realized.

The design of the spiked sprocket rollers and the features of their decouplability are so devised that the spiked rollers move freely when the respective control knobs are pressed, and when the knobs are released the respective rollers are recouplable to the drive system at ratchet engaging positions whereby the successive positions are at a smaller angular separation than that between two spikes on each spiked roller.

However, it is within the scope of the present invention to embody a coupling which enables coupling at any variable position which could be accomplished, for example, by utiizing a friction clutch.

The drive system comprises a motor-and-transmission assembly 36, which in the present case is coordinated with the film transport mechanism, and a drive belt 37 which is drivable by a continuously running drive pulley 38 of assembly 36. Drive belt 37 is passed over guide pulleys 39, around drive pully 40 of the mirror shutter, and around the drive pulleys 41 of the spiked rollers. The stepping mechanism in the film transport mechanism is driven directly by the motor-and-transmission assembly, through the intermediary of, for example, a maltese cross drive.

FIG. 3 shows a cross section of spiked sprocket rollers 26 and 27, including the control knob decoupling device i.e., decoupling device with control knob, and the mounting to the frame 20. This configuration is the same for both spiked sprocket rollers. The film guides are not shown, for consideration of ease of reading and interpretation of the figure.

Spiked rolles 26 and 27 are secured to a coaxial hub 42 by means of a countersunk screw 43. Hub 42 in turn is fastened to a hollow shaft 44 by a worm screw 45. Hollow shaft 44 is rotatably mounted in bearing bushings 46 which are part of a bearing flange 47 over which flange is attached by a bolt 49 to the mounting frame 20 of the motion picture camera. The drive pulley 41 is attached to the free end of the hollow shaft 44 which extends out from bearing flange 47, so that the pulley rotates freely. A circumferential channel 49 accepts the drive belt 37. Barrier flanges 60 prevent drive pulley 41 from sliding lengthwise along the hollow shaft 44.

Figure 4:
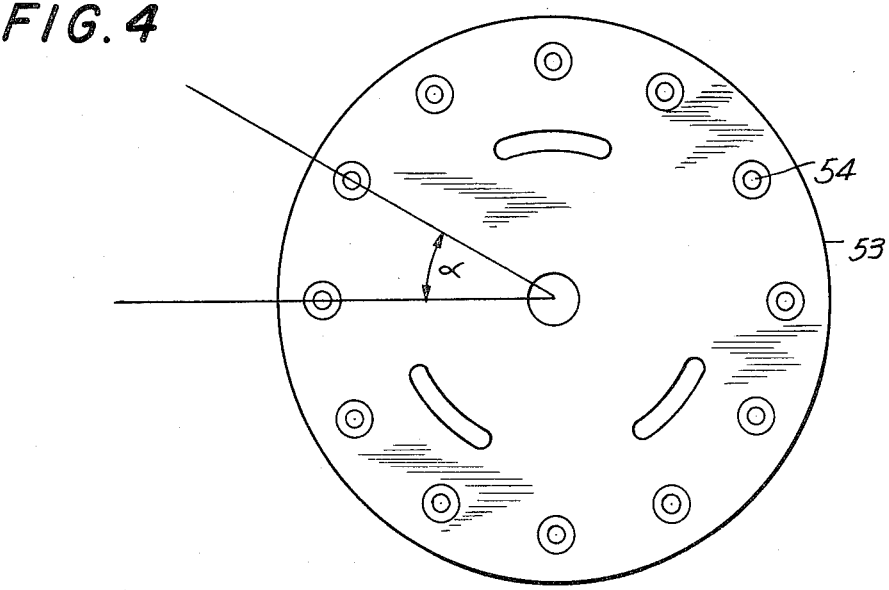
FIG. 4 is a plan view of the clutch plate (thrust plate) of the coupling (i.e., clutch) device utilized with each spiked roller.

Hollow shaft 44 accepts a coupling shaft 50 which extends outward beyond shaft 44 on both ends. Shaft 50 is freely rotatable and slidable in hollow shaft 44. A thrust plate 53 is attached to the end of the coupling shaft which is next to drive pulley 41; this attachment is accomplished by means of a cylindrical pin 52. At least the front side of thrust plate 53 (FIG. 4) which faces the drive pulley is furnished with indentations (detents) 54 which are disposed at equal intervals around a circle which is concentric with the edge of the disc. The angular interval $\alpha$ between two successive indentations 54 is chosen smaller than the interval between two successive spikes of the spiked roller. The end face of the drive pulley which borders on the thrust plate bears a coupling projection 55 which is engaged by an indentation 54 in the coupling of the thrust plate 53 to the drive pulley 41. In this way, a forced-locking drive connection to coupling shaft 50 is produced. The control knob 34 or 35 is attached by a cylindrical pin 51 to the other end of the coupling shaft. The control knob 34 or 35 is pressed away from the end face of hub 42 or sprocket roller by a spring 56, and by these means at the same time an indentation 54 is pressed onto the coupling projection 55. The control knob, hub, and consequently also the spiked roller are connected and made rotationally secure with respect to each other by a coupling through-pin 57. The transmission of force to the spiked roller thus proceeds from the drive pulley through the engaged thurst plate and the hollow shaft into the control knob, the coupling through-pin 57 and into the spiked roller or into the hub which is rigidly connected to the spiked roller.

By pushing the control knob in the direction of the spiked roller against the force of the spring, the coupling shaft is also pushed, and the thrust plate becomes disengaged from the coupling projection.

When the control knob is then rotated, one is free to rotate the spiked sprocket roller in either the clockwise or counterclockwise direction, the roller now being isolated from the rest of the drive system of the motion picture camera. Hence one can adjust the loop configuration ahead of or following the spiked roller in this way without lifting the film off the roller. Also, in known motion picture cameras, the finest adjustment of the loop length has been limited by the distance between two perforation holes; now this smallest change is defined by the angular separation $\alpha$ between the coupling indentations, which is selected to be smaller than the angular separation between two spikes of the spiked roller—in the case where the drive pulley 41 and thrust plate 53 are constructed to form a friction coupling, the amount of change can be as small as desired, and can be varied in whatever manner may be desired. Accordingly, the invention enables substantially finer gradations of adjustment of the film loops than with known motion picture cameras.

I claim:

1. A sprocket drive mechanism for transporting film through a motion picture camera comprising a frame, a sprocket wheel rotatably supported on said frame adapted to engage said film, a drive plate rotatably supported on said frame and drive means for rotating said drive plate, knob means coupled to said sprocket wheel for rotation therewith, a coupling plate rotatably supported on said frame and axially coupled to said knob means for selectively rotating said knob means, said knob means, when manually actuated, axially displacing said coupling plate between a first position where said coupling plate is engaged with said drive plate for rotation therewith and a second position where said coupling plate is disengaged from said drive plate, said coupling plate, when in said first position, rotating said knob means which rotates said sprocket wheel, said knob means, when said coupling plate is in said second position, being manually rotatable to permit manual rotation of said sprocket wheel to adjust said film.

2. The sprocket mechanism as claimed in claim 1, further comprising a hollow shaft and a rod slidably disposed in said shaft, said drive plate being rotatably coupled to said hollow shaft, said rod axially coupling said knob means to said coupling plate.

3. The sprocket mechanism as claimed in claim 2, wherein said coupling plate includes a plurality of indentations circumferentially disposed therearound, said drive plate including at least one projection for selective engagement with said indentations.

4. The sprocket mechanism as claimed in claim 3, wherein said knob means includes biasing means for normally biasing said coupling plate in said first position.

5. The sprocket mechanism as claimed in claim 4, wherein said sprocket wheel includes a plurality of sprocket teeth, said indentations on said coupling plate being spaced apart to define an angular interval that is smaller than the interval between adjacent sprocket teeth on said sprocket wheel.

6. The sprocket mechanism as claimed in claim 5, wherein said knob means includes a pin means for coupling said knob means to said sprocket wheel.

* * * * *